(12) United States Patent
Kraft

(10) Patent No.: US 8,907,573 B2
(45) Date of Patent: Dec. 9, 2014

(54) LED CURRENT CONTROL SYSTEM FOR LED DRIVE SYSTEM WITH MULTIPLE DIMMING INPUTS

(71) Applicant: Analog Devices, Inc., Norwood, MA (US)

(72) Inventor: Jonathan Kraft, Frederick, CO (US)

(73) Assignee: Analog Devices, Inc., Norwood, MA (US)

( * ) Notice: Subject to any disclaimer, the term of this patent is extended or adjusted under 35 U.S.C. 154(b) by 40 days.

(21) Appl. No.: 13/777,045

(22) Filed: Feb. 26, 2013

(65) Prior Publication Data

US 2014/0055044 A1 Feb. 27, 2014

Related U.S. Application Data

(60) Provisional application No. 61/670,458, filed on Jul. 11, 2012.

(51) Int. Cl.
*H05B 37/02* (2006.01)
*H05B 33/08* (2006.01)

(52) U.S. Cl.
CPC ............ *H05B 33/0809* (2013.01); *H05B 37/02* (2013.01); *H05B 33/0827* (2013.01); *Y02B 20/341* (2013.01); *H05B 33/0815* (2013.01); *H05B 33/0836* (2013.01); *Y02B 20/347* (2013.01); *H05B 33/0884* (2013.01)
USPC .......... 315/185 R; 315/307; 315/308; 315/317

(58) Field of Classification Search
USPC ............... 315/185 R, 307–312, 317, 210
See application file for complete search history.

(56) References Cited

U.S. PATENT DOCUMENTS

| | | | | |
|---|---|---|---|---|
| 8,189,313 B1* | 5/2012 | Kraft | ............. | 361/93.1 |
| 8,237,372 B2* | 8/2012 | Hoogzaad et al. | ............. | 315/291 |
| 8,274,238 B2* | 9/2012 | Szczeszynski et al. | ........ | 315/247 |
| 8,643,292 B2* | 2/2014 | Tang et al. | ..................... | 315/194 |
| 2008/0180386 A1* | 7/2008 | Liao et al. | ..................... | 345/102 |
| 2010/0171435 A1* | 7/2010 | Chitta et al. | .................. | 315/246 |
| 2011/0012519 A1* | 1/2011 | Zhao | ......................... | 315/185 R |
| 2011/0115396 A1* | 5/2011 | Horvath et al. | ............... | 315/250 |
| 2012/0194091 A1* | 8/2012 | Darshan | ..................... | 315/209 R |
| 2013/0147372 A1* | 6/2013 | Williams et al. | .......... | 315/185 R |

* cited by examiner

*Primary Examiner* — Douglas W Owens
*Assistant Examiner* — Pedro C Fernandez
(74) *Attorney, Agent, or Firm* — Schwegman Lundberg & Woessner, P.A.

(57) ABSTRACT

A LED current control system for use with an LED drive system which includes LED strings connected in series with respective current sink circuits, each of which causes a current to be conducted by the LED string to which it is connected. The drive system includes 3 or more 'dimming' inputs with which the LED string currents can be adjusted. The LED current control system comprises at least one minimum circuit which receives two or more dimming inputs and produces an output which is proportional to the lesser of the inputs, a multiplier circuit which receives the outputs of the minimum circuits and at least one other dimming input and produces an output ILED which is proportional to the product of the received signals, and a sink control circuit which receives ILED and controls the current sink circuits such that the string currents vary with ILED.

19 Claims, 2 Drawing Sheets

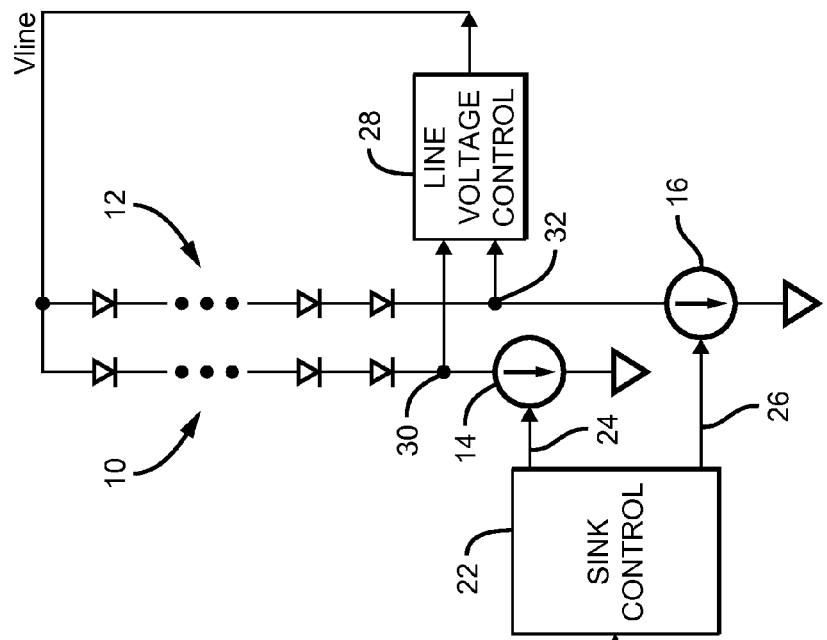
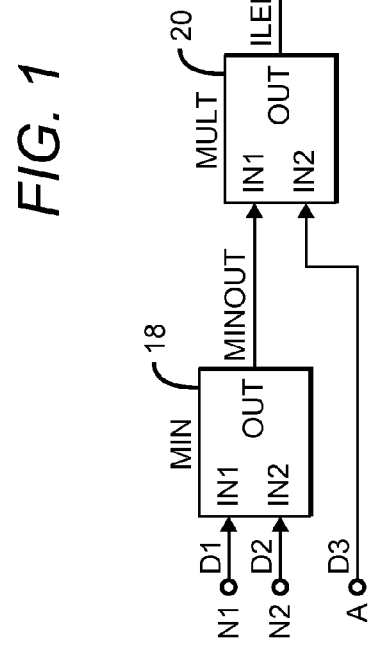
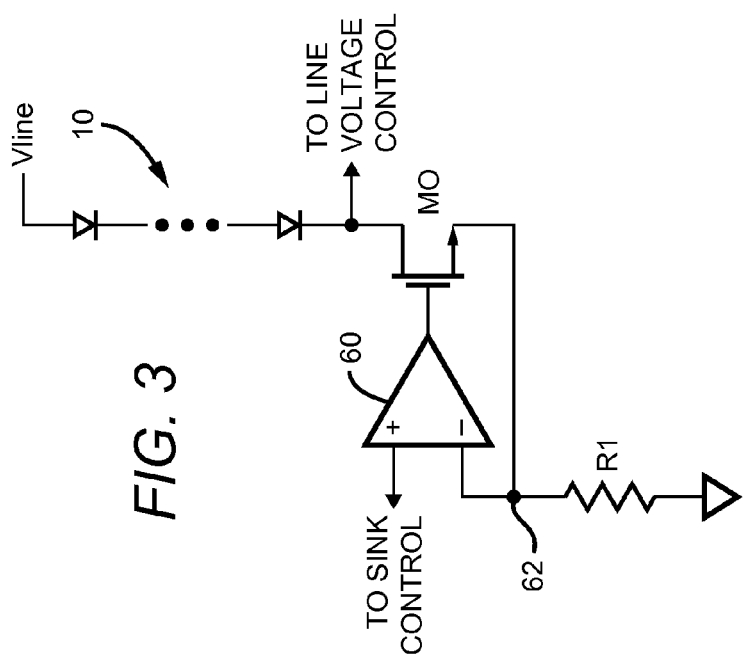
FIG. 1
FIG. 3

US 8,907,573 B2

LED CURRENT CONTROL SYSTEM FOR LED DRIVE SYSTEM WITH MULTIPLE DIMMING INPUTS

RELATED APPLICATIONS

This application claims the benefit of provisional patent application No. 61/670,458 to Kraft et al., filed Jul. 11, 2012.

BACKGROUND OF THE INVENTION

1. Field of the Invention

This invention relates generally to series/parallel LED drive systems, and more particularly to LED drive systems designed to accommodate multiple dimming inputs.

2. Description of the Related Art

LEDs (light emitting diodes), often connected in series to form LED 'strings', are being used to provide light in ever more challenging systems. The drive systems used to control the current conducted by the LEDs often require multiple means to dim (or brighten) the LEDs. This is accomplished by decreasing or increasing the average LED current. LEDs are dimmed for various reasons, including, for example, aesthetics, fault protection, and power savings. Newer LED systems require more and more means to dim the LEDs.

There are several problems that may arise for LED systems having multiple dimming inputs. For one, more than 2 dimming inputs may create a control problem for managing the LED current. Some systems control an LED's brightness by pulse-width modulating (PWM) its current; problems with this approach may occur due to the noise generated by the modulation, and/or due to difficulties combining the PWM signal with other dimming control signals.

One approach is described in National Semiconductor's LM3464 datasheet. Here, 2 dimming signals are combined to output a PWM'd LED current. However, this technique may produce erratic signals (noise) and/or beat frequencies that may create visible lighting patterns. To mitigate these potential problems, it is recommended that one dimming signal be high frequency and one be very low frequency. But PWM dimming at low frequencies (<20 kHz) can create noticeable audible noise due to the high pulsed powers involved. The problem can become exponentially worse if another PWM dimming signal is added.

Many LED control ICs provide one PWM dimming input and one analog dimming input. One example is shown in Texas Instrument's TLC5960 datasheet. Here, the LED current is controlled by an operational amplifier that receives an analog voltage (VADJ) at one input and a reference voltage at its other input to set a DC current, while another signal pulses the output current at a particular duty cycle. However, this scheme is unable to handle multiple inputs, as the reference voltage would become unreasonably small.

SUMMARY OF THE INVENTION

A LED current control system for a LED drive system with multiple dimming inputs is presented which addresses the problems noted above.

The present LED current control system is for use with an LED drive system which includes one or more LED strings connected in series with respective current sink circuits, each of which is arranged to cause a current to be conducted by the LED string to which it is connected. The LED drive system should also include 3 or more 'dimming' inputs with which the LED string currents can be adjusted. The LED current control system comprises:

at least one minimum circuit arranged to receive the signals applied to two or more of the dimming inputs at respective inputs and to produce an output which is proportional to the lesser of the applied inputs;

at least one multiplier circuit arranged to receive the outputs of the at least one minimum circuit and at least one other dimming input at respective inputs, and to produce an output ILED which is proportional to the product of the signals applied to the multiplier circuits' inputs; and a sink control circuit arranged to receive the multiplier circuit output ILED and to control the current sink circuits such that the LED string currents vary with ILED.

The signals applied to the dimming inputs can be analog, digital or PWM signals. There can be multiple minimum circuits and multiple multiplier circuits if needed. In general, ILED is given by:

$$\text{ILED} = \text{MIN}(N1, N2, \ldots) * \text{MIN}(M1, M2, \ldots) * A * B * \ldots$$

where Nx, Mx, A, and B are analog, digital or PWM signals applied to respective dimming inputs. ILED can be a DC current, a digital value, a PWM signal, or a combination of PWM and DC current, such as a scaled DC current that is pulse-width modulated.

One or more of the minimum and multiplier circuits may be implemented digitally, with analog-to-digital converters (ADCs) employed as needed to convert non-digital dimming inputs to a digital values. A digital-to-analog converter (DAC) might be used to convert a digital ILED value to an analog output capable of controlling LED string current.

These and other features, aspects, and advantages of the present invention will become better understood with reference to the following description and claims.

BRIEF DESCRIPTION OF THE DRAWINGS

FIG. 1 is a block/schematic diagram illustrating the principles of the present LED current control system for a LED drive system with multiple dimming inputs.

FIG. 3 is a schematic of one possible implementation of a current sink circuit as might be used with an LED drive system as described herein.

DETAILED DESCRIPTION OF THE INVENTION

Figure 2:
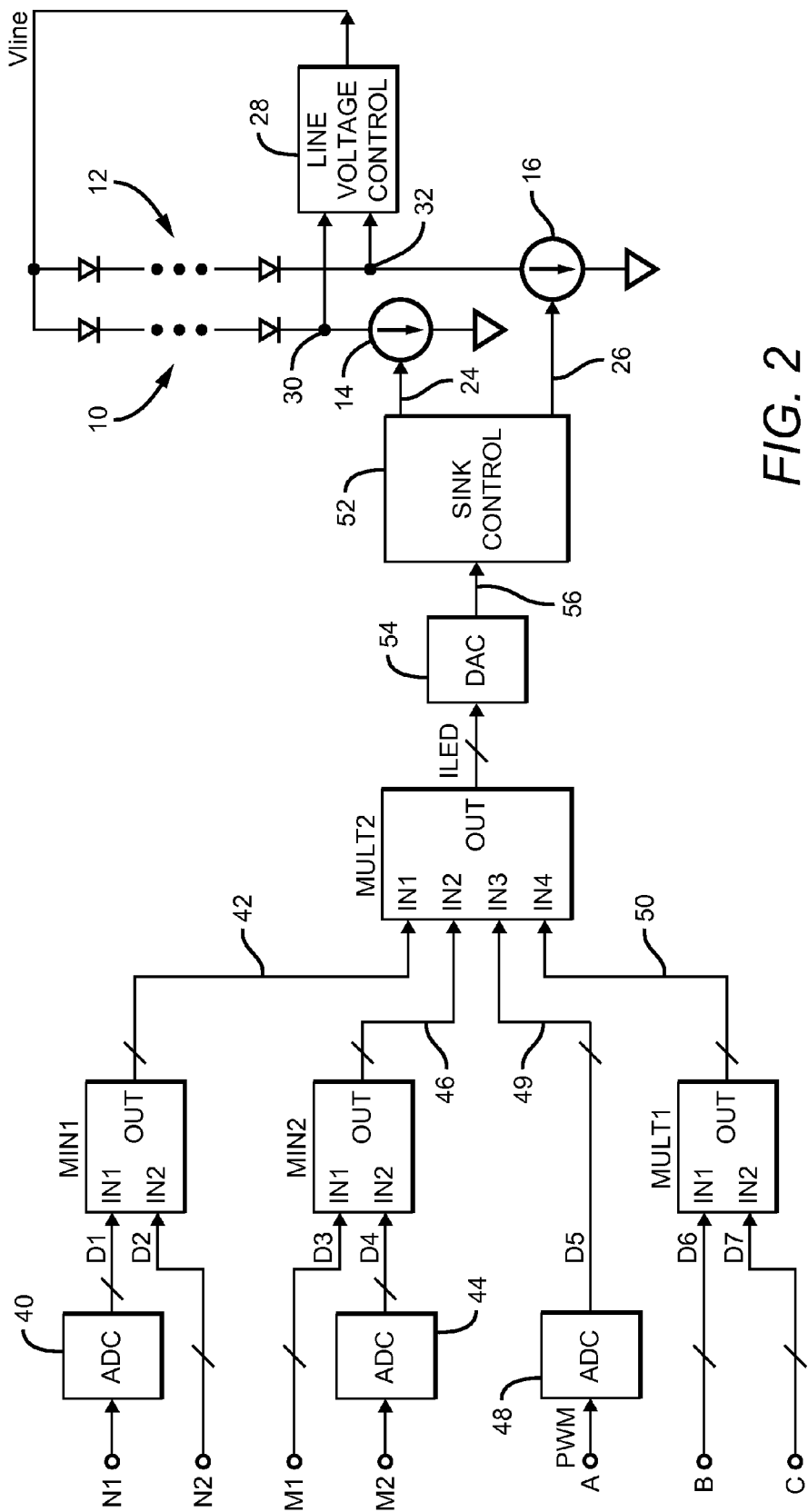
FIG. 2 is a block/schematic diagram of another possible embodiment of the present LED current control system for a LED drive system with multiple dimming inputs.

The basic principles of a LED current control system for a LED drive system with multiple dimming inputs are illustrated in FIG. 1. The LED drive system includes one or more LED strings 10, 12 connected in series with respective current sink circuits 14, 16, each of which is arranged to cause a current to be conducted by the LED string to which it is connected; each LED string may include 2 or more LEDs connected in series. The LED drive system includes 3 or more 'dimming' inputs, the purpose of which is to adjust—typically reduce—the LED string currents; in the example shown, there are three dimming inputs D1, D2 and D3, to which signals N1, N2 and A, respectively, are applied.

To accommodate the multiple dimming inputs, the present LED current control system includes at least one minimum circuit 18 arranged to receive the signals applied to two or more of the dimming inputs at respective inputs (here, signals N1 and N2 are received at dimming inputs D1 and D2, respectively, and provided to minimum circuit 18), and to produce an output MINOUT which is proportional to the lesser of the signals applied to its inputs. The system also includes at least one multiplier circuit 20 arranged to receive the outputs of the least one minimum circuit (here, just MINOUT) and the signals applied to at least one other of the dimming inputs at respective inputs (here, a signal A applied to dimming input D3, which is provided to multiplier circuit 20 along with MINOUT), and to produce an output ILED which is proportional to the product of the signals applied to the multiplier circuits' inputs. Finally, a sink control circuit 22 is arranged to receive ILED and to control current sink circuits 14 and 16 such that the LED string currents vary with ILED. For the exemplary embodiment shown in FIG. 1, ILED is given by:

$$ILED=MIN(N1, N2)*A.$$

The signals applied to the dimming inputs may take any of a number of forms, including analog, digital or PWM, with the system configured as needed to accommodate the incoming dimming signals. For example, signals N1 and N2 may be analog dimming signals, and signal A may be a PWM dimming signal. Similarly, the system can be arranged to provide ILED in any desired form, such as, for example, a DC current, a digital value, a PWM signal, or a scaled DC current that is pulse-width modulated.

Current sink circuits 14, 16 are preferably arranged to conduct currents which vary with respective control signals 24, 26, with sink control circuit 22 arranged to provide the control signals to each of the current sink circuits as needed such that the LED string currents vary with ILED.

Also shown in FIG. 1 is a line voltage control circuit 28, which provides a common line voltage to parallel-connected LED strings 10, 12. Such a circuit is typically arranged to monitor the voltages at the junctions 30, 32 of the LED strings and the current sink circuits, and to vary the common line voltage as needed to obtain a desired voltage at the junctions. The line voltage control circuit may be implemented in any of a number of ways; some possible approaches are described in co-pending patent application Ser. Nos. 13/760,881 and 13/742,770.

One or more of the minimum and multiplier circuits can be implemented digitally, to receive, output, or both receive and output digital signals as needed. For example, at least one of the minimum circuits could be arranged to receive digital signals at its inputs, and to produce a digital signal at its output. Similarly, at least one multiplier circuit can be arranged to receive digital signals at its inputs, and to produce a digital output. If needed, one or more analog-to-digital converters (ADCs) can be employed to convert non-digital dimming inputs such as analog or PWM signals to digital signals as needed.

As noted above, the present system is considerably versatile with respect to the number and types of dimming inputs that can be accommodated. In general, the present system provides an output ILED given by:

$$ILED=MIN(N1, N2, \ldots )*MIN(M1, M2, \ldots )*A*B* .$$

This versatility is illustrated with the exemplary LED current control system embodiment shown in FIG. 2. Here, there are a total of seven dimming inputs. A signal N1 is an analog dimming signal; it is converted to a digital signal with an ADC 40 and applied to dimming input D1. A signal N2 is a digital dimming signal, which is applied to dimming input D2. A minimum circuit MIN1 receives the signals at D1 and D2 and produces a digital output 42 which represents the lesser of D1 and D2.

Similarly, a digital dimming signal M1 is applied to dimming input D3 and an analog dimming signal M2 is applied to an ADC 44, the digital output of which is applied to dimming input D4. A minimum circuit MIN2 receives the signals at D3 and D4 and produces a digital output 46 which represents the lesser of D3 and D4.

A PWM signal A is applied to an ADC 48, the digital output 49 of which is applied to dimming input D5. Digital dimming signals B and C are applied to dimming inputs D6 and D7, which are applied to the inputs of a multiplier circuit MULT1; MULT1 produces a digital output 50 that represents the product of B and C. Finally, a multiplier circuit MULT2 receives outputs 42, 46, 48 and 50, and multiplies them together to produce output ILED. In this example, ILED is a digital signal which needs to be converted to an analog signal prior to being provided to the SINK CONTROL circuit 52, and so is applied to a DAC 54 which converts it to an analog signal 56. Thus, for this particular example, ILED is given by:

$$ILED=MIN(N1, N2)*MIN(M1, M2)*A*B*C.$$

Dimming inputs can be provided to serve any of a number of functions. For example, one dimming input might receive a signal that is intended to establish a 'baseline' LED string current, while another may be intended as a means to command a reduced brightness from the LED strings, possibly for aesthetic reasons. One or more dimming inputs might receive signals intended to indicate respective fault conditions which should trigger a change in LED string current. For example, dimming signals might indicate that an excessive die temperature or an excessive LED string brightness condition has been detected.

Minimum circuits would typically be preferred for use with inputs which are not normally active at the same time. For example, if one dimming input was used to frequently or continuously adjust LED string brightness, and another dimming input was only varied in the event of a fault condition such as excessive die temperature, a minimum circuit would be a suitable means of accommodating those inputs. However, if two dimming inputs are both varied consistently, a multiplier circuit would be preferred.

Note that, though minimum circuits, multiplier circuits, ADCs, DACs and sink control circuits are shown as independent circuits in FIGS. 1 and 2, these circuits may be combined into multifunctional modules in any number of ways. For example, DAC 54 in FIG. 2 might actually be implemented as a subcircuit within sink control circuit 52. One or more of the required functions might also be performed using a software-controlled processor.

Thus, the number of dimming inputs is reduced by applying minimum functions to two or more of the inputs, which is combined with multiplication of the remaining inputs. In this way, the multiple inputs are intelligently reduced, to provide signals that the LED drive system's internal references and control loops can manage without producing the control problems, noise, or beat frequencies known in the prior art.

One possible implementation of a current sink circuit as might be used with a LED drive system with a LED current control system as described herein is shown in FIG. 3. The exemplary current sink circuit includes a transistor M0 connected in series with a respective one of the LED strings (here, string 10) and is arranged to cause a desired LED string current to be conducted when a sufficient voltage is applied to the transistor's control input (here, the gate of an NMOS FET). The current sink circuit also includes a resistance R1 connected between M0 and a circuit common point, and an amplifier 60 which receives a control voltage at a first input and the voltage at the junction 62 of R1 and M0 at a second input. Amplifier 60 and M0 form a local current loop arranged to provide a voltage to M0's gate needed to force the voltage at junction 62 to be approximately equal to the control voltage, such that a desired LED string current is conducted by R1. The control voltage may be provided by a sink control circuit as described above. Note that the current sink circuit shown in FIG. 3 is merely one possible implementation; there are numerous ways in which a current sink or current source circuit could be realized and employed as part of an LED drive system as discussed herein.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A LED current control system for an LED drive system which includes one or more LED strings connected in series with respective current sink circuits, each of said current sink circuits arranged to cause a current to be conducted by the LED string to which it is connected, said LED drive system including 3 or more dimming inputs configured to receive signals to adjust said LED string currents, said LED current control system comprising:
    at least one minimum circuit arranged to receive the signals applied to two or more of said dimming inputs at respective inputs and to produce an output which is proportional to the lesser of the signals applied to said two or more dimming inputs;
    at least one multiplier circuit arranged to receive outputs of said at least one minimum circuit and the signals applied to at least one other of said dimming inputs at respective inputs and to produce an output ILED which is proportional to the product of the signals applied to inputs of said multiplier circuit; and
    a sink control circuit arranged to receive said output ILED of the at least one multiplier circuit and to control said current sink circuits such that said LED string currents vary with ILED.

2. The LED current control system of claim 1, wherein the signals applied to said dimming inputs are analog, digital or PWM signals.

3. The LED current control system of claim 1, wherein said output ILED of said multiplier circuit is given by: ILED=MIN(N1, N2, . . . )*MIN(M1, M2, . . .)*A*B* . . . wherein Nx, Mx, A and B are analog, digital or PWM signals applied to respective dimming inputs, and wherein MIN( ) is the minimum operator and the symbol * is the multiply operator.

4. The LED current control system of claim 1, wherein ILED is a DC current, a digital value, a PWM signal, or a scaled DC current that is pulse-width modulated.

5. The LED current control system of claim 1, wherein said current sink circuits are arranged to conduct currents which vary with respective control signals, said sink control circuit arranged to provide said control signals to each of said current sink circuits as needed to vary said LED string currents with ILED.

6. The LED current control system of claim 1, wherein one or more of said circuits is implemented digitally.

7. The LED current control system of claim 1, wherein one or more of said circuits is implemented with a software-controlled processor.

8. The LED current control system of claim 1, wherein at least one of said minimum circuits is arranged to receive digital signals at its inputs and to produce a digital signal at its output.

9. The LED current control system of claim 1, wherein at least one of said multiplier circuits is arranged to receive digital signals at its inputs and to produce a digital signal at its output.

10. The LED current control system of claim 1, further comprising one or more analog-to-digital converters (ADCs), each arranged to convert a non-digital dimming input to a digital signal.

11. The LED current control system of claim 1, said system arranged such that the signal applied to one of said dimming inputs establishes a baseline value of LED string current in an LED string.

12. The LED current control system of claim 1, said system arranged such that the signal applied to at least one of said dimming inputs reduces an LED string current when a fault condition is detected.

13. The LED current control system of claim 12, wherein said fault condition is an excessive die temperature or excessive LED string brightness.

14. The LED current control system of claim 1, said system arranged such that the signal applied to at least one of said dimming inputs is used to command a reduced brightness from the LED strings for aesthetic reasons.

15. The LED current control system of claim 1, further comprising at least one digital-to-analog converter (DAC) arranged to receive said multiplier circuits' output ILED at its digital input and to produce an analog output which controls said LED string current.

16. The LED current control system of claim 1, wherein at least one of said LED strings comprises two or more LEDs connected in series.

17. The LED current control system of claim 1, wherein each of said current sink circuits includes a transistor connected in series with a respective one of said LED strings and is arranged to cause a specified LED string current to be conducted when a specified voltage is applied to said transistor's control input.

18. The LED current control system of claim 17, wherein each of said current sink circuits comprises: a resistance connected between said transistor and a circuit common point; and an amplifier which receives a control voltage at a first input and a voltage at the junction of said resistance and said transistor at a second input, said amplifier and transistor forming a local current loop arranged to provide the specified voltage to a control input of said transistor to cause the voltage at said junction of said resistance and said transistor to be approximately equal to said control voltage.

19. The LED current control system of claim 18, wherein said sink control circuit provides said control voltage to each of said current sink circuits.

* * * * *